US012563553B2

(12) United States Patent
Cheng et al.

(10) Patent No.: US 12,563,553 B2
(45) Date of Patent: Feb. 24, 2026

(54) METHODS AND APPARATUSES FOR HYBRID AUTOMATIC REPEAT REQUEST OPERATIONS IN WIRELESS COMMUNICATION SYSTEMS

(71) Applicant: SHARP KABUSHIKI KAISHA, Sakai (JP)

(72) Inventors: Chien-Chun Cheng, Taipei (TW); Chia-Hao Yu, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 406 days.

(21) Appl. No.: 17/634,858

(22) PCT Filed: Sep. 23, 2020

(86) PCT No.: PCT/CN2020/117215
§ 371 (c)(1),
(2) Date: Feb. 11, 2022

(87) PCT Pub. No.: WO2021/063229
PCT Pub. Date: Apr. 8, 2021

(65) Prior Publication Data
US 2022/0330298 A1 Oct. 13, 2022

Related U.S. Application Data

(60) Provisional application No. 62/910,571, filed on Oct. 4, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/23* (2023.01); *H04W 72/54* (2023.01)

(58) Field of Classification Search
CPC ............ H04W 72/1273; H04W 72/23; H04W 72/54; H04L 1/1812; H04L 5/0053; H04L 1/1822; H04L 1/1864
See application file for complete search history.

(56) References Cited

U.S. PATENT DOCUMENTS

| | | | |
|---|---|---|---|
| 2020/0196383 A1* | 6/2020 | Tsai ...................... | H04L 1/1614 |
| 2020/0351026 A1* | 11/2020 | Babaei .................. | H04L 1/1822 |
| 2022/0247520 A1* | 8/2022 | Zhang .................. | H04L 1/1864 |

FOREIGN PATENT DOCUMENTS

WO 2019/160737 A1 8/2019

OTHER PUBLICATIONS

3GPP TS 38.321, "3rd Generation Partnership Project; Technical Specification Group Radio Access Network; NR; Medium Access Control (MAC) protocol specification (Release 15)", V15.11.0 (Dec. 2020).

(Continued)

*Primary Examiner* — Mandish K Randhawa
(74) *Attorney, Agent, or Firm* — ScienBiziP, P.C.

(57) ABSTRACT

A communication method performed by a UE includes the UE receiving a HARQ-ACK-less list from a BS, the HARQ-ACK-less list indicating at least one HARQ process in which a HARQ-ACK information transmission for a DL transmission is disabled, wherein the at least one HARQ process is indicated by including a set of HARQ process IDs in the HARQ-ACK-less list; receiving a first MAC CE on a PDSCH from the BS, the PDSCH being associated with a first HARQ process ID in the set of HARQ process IDs; and transmitting HARQ-ACK information for the PDSCH in (Continued)

response to receiving the first MAC CE irrespective of the reception of the HARQ-ACK-less list. A UE using such method is also provided.

14 Claims, 4 Drawing Sheets

(51) Int. Cl.
| | |
|---|---|
| *H04L 5/00* | (2006.01) |
| *H04W 72/23* | (2023.01) |
| *H04W 72/54* | (2023.01) |

(56) References Cited

OTHER PUBLICATIONS

3GPP TS 38.133, "3rd Generation Partnership Project; Technical Specification Group Radio Access Network; NR; Requirements for support of radio resource management (Release 17)", V17.0.0 (Dec. 2020).

3GPP TS 38.213, "3rd Generation Partnership Project; Technical Specification Group Radio Access Network; NR; Physical layer procedures for control (Release 15)", V15. 12.0 (Dec. 2020).

Nokia, Nokia Shanghai Bell, "Considerations on HARQ in NTN", R1-1911222, 3GPP TSG RAN WG1 Meeting #98bis, Chongqing, China, Oct. 14-20, 2019.

Nokia, Nokia Shanghai Bell, "Considerations on HARQ in NTN", R1-1913019, 3GPP TSG RAN WG1 Meeting #99, Reno, USA, Nov. 18-22, 2019.

Huawei, HiSilicon, "Discussion on HARQ for NTN", R1-1910065, 3GPP TSG RAN WG1 Meeting #98bis, Chongqing, China, Oct. 14-20, 2019.

Nomor Research GmbH, "Report of Email Discussion [106# 71][NR/NTN] HARQ (Nomor)", R2-1908987, 3GPP TSG-RAN WG2 Meeting #107, Prague, CZ, Aug. 26-30, 2019.

Sony, "Consideration on delay-tolerant HARQ for NTN", R1-1906849, 3GPP TSG RAN WG1 Meeting #97, Reno, USA, May 13-17, 2019.

Huawei, HiSilicon, "Discussion on disabling HARQ in NTN", R2-1907842, 3GPP TSG-RAN WG2 Meeting #106, Reno, USA, May 13-17, 2019.

MediaTek Inc., "Summary for more delay-tolerant re-transmission mechanisms in NR-NTN", R1-1907757, 3GPP TSG RAN WG1 Meeting #97, Reno, Nevada, USA, May 13-17, 2019.

* cited by examiner

METHODS AND APPARATUSES FOR HYBRID AUTOMATIC REPEAT REQUEST OPERATIONS IN WIRELESS COMMUNICATION SYSTEMS

CROSS-REFERENCE TO RELATED APPLICATION(S)

The present disclosure is the national stage application, filed under 35 U.S.C. § 371, of International Patent Application No. PCT/CN2020/117215, filed on Sep. 23, 2020, which claims the benefit of and priority to U.S. Provisional Patent Application Ser. No. 62/910,571, filed on Oct. 4, 2019, the contents of all of which are hereby fully incorporated herein by reference for all purposes.

FIELD

The present disclosure generally relates to wireless communications, and more particularly, to methods and apparatuses for Hybrid Automatic Repeat reQuest (HARQ) operations in wireless communication systems.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for HARQ operations in a wireless communication system.

According to a first aspect of the present disclosure, a communication method performed by a User Equipment (UE) is provided. The communication method includes the UE receiving a Hybrid Automatic Repeat reQuest (HARQ) Acknowledgement (ACK)-less list from a Base Station (BS), the HARQ-ACK-less list indicating at least one HARQ process in which a HARQ-ACK information transmission for a Downlink (DL) transmission is disabled, wherein the at least one HARQ process is indicated by including a set of HARQ process Identities (IDs) in the HARQ-ACK-less list; receiving a first Medium Access Control (MAC) Control Element (CE) on a Physical Downlink Shared Channel (PDSCH) from the BS, the PDSCH being associated with a first HARQ process ID in the set of HARQ process IDs; and transmitting HARQ-ACK information for the PDSCH in response to receiving the first MAC CE irrespective of the reception of the HARQ-ACK-less list.

In some implementations of the first aspect of the present disclosure, the communication method further includes the UE receiving a first Medium Access Control (MAC) Control Element (CE) on a Physical Downlink Shared Channel (PDSCH) from the BS. The PDSCH is associated with a first HARQ process ID in the set of HARQ process IDs.

In some implementations of the first aspect of the present disclosure, the communication method further includes the UE transmitting HARQ-ACK information for the PDSCH regardless of the HARQ-ACK-less list.

In some implementations of the first aspect of the present disclosure, the communication method further includes receiving an indication from the BS, the indication identifying an exception to the HARQ-ACK-less list by including at least one HARQ process ID from the set of HARQ process IDs in the indication, the at least one HARQ process ID including the first HARQ process ID.

In some implementations of the first aspect of the present disclosure, the indication is received via Downlink Control Information (DCI).

In some implementations of the first aspect of the present disclosure, the indication is received via a second MAC CE.

In some implementations of the first aspect of the present disclosure, the indication is received via a Radio Resource Control (RRC) configuration.

In some implementations of the first aspect of the present disclosure, the HARQ-ACK-less list is contained in an RRC configuration.

In some implementations of the first aspect of the present disclosure, the first MAC CE includes a UE contention resolution ID.

In some implementations of the first aspect of the present disclosure, the first MAC CE includes a time alignment command.

In some implementations of the first aspect of the present disclosure, the first MAC CE includes a Semi-Persistent (SP) Zero Power (ZP) Channel State Information (CSI) Reference Signal (RS) ID.

In some implementations of the first aspect of the present disclosure, the first MAC CE includes a CSI RS resource set ID.

According to a second aspect of the present disclosure, a UE is provided. The UE includes a memory storing instructions and at least one processor coupled to the memory. The at least one processor is configured to execute the instructions to: receive a HARQ-ACK-less list from a BS, the HARQ-ACK-less list indicating at least one HARQ process in which a HARQ-ACK information transmission for a DL transmission is disabled, wherein the at least one HARQ process is indicated by including a set of HARQ process IDs in the HARQ-ACK-less list; receive a first MAC CE on a PDSCH from the BS, the PDSCH being associated with a first HARQ process ID in the set of HARQ process IDs; and transmit HARQ-ACK information for the PDSCH in response to receiving the first MAC CE irrespective of the reception of the HARQ-ACK-less list.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
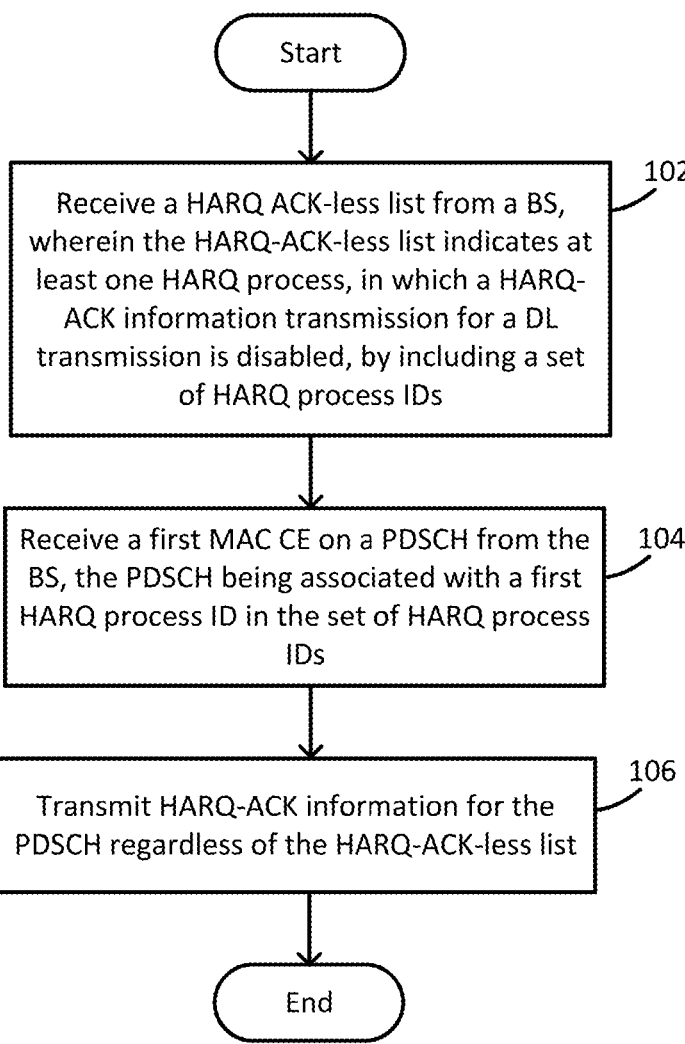
FIG. 1 illustrates a flowchart for a communication method performed by a UE, in accordance with an implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the so-described combination, group, series, and the equivalent. Besides, the terms "system" and "network" described in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, for a non-limiting explanation, specific details, such as functional entities, techniques, protocols, standards, and the like, are set forth for providing an understanding of the described technology. In other examples, a detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations described in this specification are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one BS, at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the DL and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Every-thing (V2X) services. Each cell may have overlapped coverage areas with other cells. In Multi-RAT Dual Connectivity (MR-DC) cases, the Primary Cell (PCell) of a Master Cell Group (MCG) or a Secondary Cell Group (SCG) may be called as a Special Cell (SpCell). A PCell may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmis-sion data, the guard period, the UL transmission data should also be configurable, for example, based on the network dynamics of NR. Besides, an SL resource may also be provided in an NR frame to support ProSe services.

Non-Terrestrial Networks (NTNs) refer to networks, or segments of networks, using a spaceborne vehicle for transmission, e.g., using Low Earth Orbiting (LEO) satellites and Geostationary Earth Orbiting (GEO) satellites.

In 3GPP Release 16 (Rel-16), some scenarios (e.g., transparent GEO satellite network, transparent LEO satellite network, and regenerative LEO satellite network) have been started with key issues and solutions. For example, a transparent GEO satellite network may refer to a relay-based NTN, including Radio Frequency (RF) functions only. The GEO satellites simply perform amplify-and-forward in space. Transparent LEO satellite network refers to a relay-based NTN. In this case, the LEO satellites simply perform amplify-and-forward in space. Regenerative LEO satellite network refers to a network architecture, where LEO satellites have full capability of RAN functions as a BS in NR. In this case, UEs are served directly by the satellites.

The HARQ protocol is the primary way of handling retransmissions in NR. In case of an erroneously received packet, a retransmission is requested. In HARQ with soft combining, the erroneously received packet is stored in buffer memory and later combined with the retransmission to obtain a single, combined packet that is more reliable than its constituents. The decoding of the error-correction code operates on the combined signal.

In NTN, due to long Round Trip Time (RTT), HARQ may be inefficient for a time-urgent service. To handle this, the enabling/disabling of HARQ feedback may be configurable on a per-UE and per-HARQ process basis. Specifically, for NTN, the network may configure the HARQ processes, whereas the corresponding HARQ feedback transmission can be enabled or disabled. When the HARQ feedback transmission is enabled, the HARQ feedback will be sent; when disabled, the HARQ feedback will not be sent in the UL.

It is noted that the terms "HARQ-ACK information" and "HARQ feedback" can be interchangeably utilized in the present disclosure.

However, if a HARQ feedback transmission is disabled on a per-UE basis, some NR procedures may have issues when there is no HARQ feedback. If there is no HARQ feedback, a MAC-CE activation or deactivation command could not be applied on time, and Semi-Persistent Scheduling (SPC) might introduce more uncertainty due to no confirmation message. Therefore, there is a need to provide improved NR procedures to adapt to the enabling/disabling mechanism of HARQ feedback.

Case #1: Indicated by Network

In this case, the detailed designs on how a BS or network indicates whether a HARQ feedback should be performed by the UE for a DL transmission (e.g., a PDSCH reception) are provided.

Approach #1: HARQ-ACK-less Exception List with HARQ Process ID(s) Via Radio Resource Control (RRC)

In some implementations, a BS may indicate a set of one or multiple HARQ process ID(s) to a UE via an RRC message. The set may be associated with an RRC message carrying a disabling HARQ feedback command on a per-UE basis.

A UE may be configured with the set of one or multiple HARQ process ID(s). If a PDSCH reception is associated with the HARQ process ID in the configured set, the UE may generate a HARQ feedback corresponding to the received PDSCH and provide the HARQ feedback to the BS, and regardless of whether the UE is configured in an operation mode of HARQ-ACK-less such that there is no HARQ feedback on a per-UE basis.

Approach #2: HARQ-ACK-less Exception Indicator Via a Downlink Control Information (DCI) Field In some implementations, a BS may indicate a HARQ feedback request via a DCI field in a scheduling DCI in a Physical Downlink Control Channel (PDCCH). The field may be associated with a HARQ process of a scheduling DCI for a PDSCH.

A UE may be indicated by the DCI field for the PDSCH reception. If the DCI field indicates the HARQ feedback request, e.g., the bit of the field is 1, denoted for a HARQ request, the UE may generate a HARQ feedback for the received PDSCH and provide the HARQ feedback to the BS, regardless of whether the UE is configured with an operation mode that there is no HARQ feedback on a per-UE basis. Otherwise (e.g., the bit of the field is 0, referring to no HARQ request), the UE does not generate the HARQ feedback.

Approach #3: HARQ-ACK-less Exception Indicator Via a MAC-CE

In some implementations, a BS may indicate a HARQ feedback request via a MAC-CE field in a scheduling MAC-CE in a PDSCH. The field may be associated with a scheduling MAC-CE that contains an activation command or a deactivation command. The field may be associated with a HARQ process of a scheduling DCI for a PDSCH.

A UE may be indicated by the DCI field in the PDSCH reception. If the MAC-CE field indicates the HARQ feedback request, e.g., the field contains a bit of 1 as having a HARQ request, the UE may generate a HARQ feedback for the received PDSCH and provide the HARQ feedback to the BS, regardless of whether the UE is configured with an operation mode that there is no HARQ feedback on a per-UE basis. Otherwise (e.g., the field of the MAC-CE contains a bit of 0), the UE does not generate HARQ feedback.

Approach #4: HARQ Feedback Based on a Received DCI

In some implementations, by scheduling a PDSCH reception via a specific PDCCH, a BS (e.g., gNB) may implicitly indicate to a UE to perform a HARQ feedback transmission for the dynamically scheduled PDSCH receptions.

For example, once a DCI, which schedules the PDSCH reception, is received on a specific search space, the UE may need to perform the corresponding HARQ feedback transmission. The specific search space may be a UE-specific or a common search space.

For example, once a DCI, which schedules the PDSCH reception, is received on a search space which is further associated with a certain Control Resource Set (CORESET), e.g., CORESET#0, the UE may need to perform the corresponding HARQ feedback.

For example, once a DCI, which schedules the PDSCH reception, is scrambled by a specific/configured Radio Network Temporary Identity (RNTI), e.g., ground-based RNTIs or NTN-specific RNTIs, the UE may need to perform the corresponding HARQ feedback transmission.

Case #2: Determined by UE

In this case, the detailed designs on how a UE determines whether a HARQ feedback transmission should be performed for a DL transmission (e.g., PDSCH) are provided.

Approach #1: HARQ-ACK-less Exception Conditions in which the UE Still Generates HARQ-ACK In some implementations, a new decision-making rule may be added for a procedure for a UE to generate a HARQ feedback for a HARQ process when the UE is configured to have no feedback for the entire HARQ processes or the corresponding HARQ process is configured for no HARQ feedback.

The rule provides some procedures and conditions such that if one of the criteria is satisfied, then UE may generate a HARQ feedback, regardless of whether the corresponding HARQ process is configured with no HARQ feedback (e.g., regardless of whether the HARQ feedback transmission corresponding to the HARQ process is disabled).

Based on the approach(s) described above, the following provides more detailed descriptions for different scenarios.

Timing for SCell Activation or Deactivation

In some implementations, with reference to slots for Physical Uplink Control Channel (PUCCH) transmissions, when a UE receives, in a PDSCH, an activation command for an SCell ending in slot n, the UE applies the corresponding actions, e.g., activate the SCell, no later than the minimum requirement for signal possessing and no earlier than slot n+k, where the value k is configured by higher layers or indicated by Layer 1 (L1) signaling.

In some implementations, regardless of whether a UE is configured with no HARQ feedback (e.g., HARQ feedback transmission is disabled), the UE may still provide the HARQ feedback if one of the following conditions (1) to (4) is satisfied:

(1) the PDSCH carrying the activation command is associated with a HARQ process ID that is included in an exception list configured by an RRC Information Element (IE).

For HARQ process ID(s) included in the exception list, HARQ feedback is performed.

(2) the PDSCH carries the activation command via a MAC CE that contains a field indicator of a HARQ feedback request as '1' (or another specific value) and refers to a HARQ feedback demand.

For example, the field indicator may be a one-bit indicator contained in both formats: an SCell Activation/Deactivation MAC CE of one octet and an SCell Activation/Deactivation MAC CE of four octets.

For example, the field indicator may also be included in the sub-header of an SCell Activation/Deactivation MAC CE of one octet and an SCell Activation/Deactivation MAC CE of four octets.

For example, the field indicator may be a specific value of a Logical Channel ID (LCID) for the SCell Activation/Deactivation MAC CE of one octet and an SCell Activation/Deactivation MAC CE of four octets.

(3) the PDSCH carrying the activation command is associated with a scheduling DCI that contains a DCI field indicating a positive HARQ feedback request, e.g., '1'. The UE may perform the HARQ feedback transmission when receiving the positive HARQ feedback request.

(4) the UE receives, in a PDSCH, an activation command for an SCell.

PUCCH Power Control

In some implementations, if a UE transmits a PUCCH on an active UL Bandwidth Part (BWP) in the PCell using the PUCCH power control adjustment state, the UE may determine the PUCCH transmission power based on the parameters such as $P_{o\_PUCCH}$ and PL, which are associated with spatial relation information of the PUCCH provided by an RRC IE pucch-SpatialRelationInfoId. PL is a downlink pathloss estimate in dB calculated by the UE using a reference signal (RS) and $P_{o\_PUCCH}$ is an initial power control value in dB provided by the NW.

If the UE is provided with multiple values for pucch-SpatialRelationInfoId and the UE receives an activation command indicating a value of pucch-SpatialRelationInfold, the UE may determine the p0-PUCCH-Value value through the link to a corresponding p0-PUCCH-Id index provided by the activated pucch-SpatialRelationInfold. The UE may apply the activation command in the first slot that is after slot $k+3 \cdot N_{slot}^{subframe, \mu}$, where k is the slot where the UE transmits a PUCCH with HARQ-ACK information for the PDSCH providing the activation command, and μ is the SCS configuration for the PUCCH transmission.

In some implementations, regardless of whether a UE is configured with no HARQ feedback, the UE may still provide a HARQ feedback if one of the following conditions (1) to (5) is satisfied:

(1) the PDSCH carrying the activation command is associated with a HARQ process ID that is included in an exception list configured by an RRC IE.

For the HARQ process ID(s) included in the exception list, the corresponding HARQ feedback transmission is performed.

(2) the PDSCH carrying the activation command by a MAC CE that contains a MAC-CE field indicator of HARQ feedback request as '1' (or another specific value) refers to a HARQ feedback demand.

(3) the PDSCH carrying the activation command is associated with a scheduling DCI that contains a DCI field indicating a positive HARQ feedback request, e.g., '1'. The UE may perform the HARQ feedback transmission when receiving the positive HARQ feedback request.

(4) the UE receives, in a PDSCH, an activation command indicating a value of pucch-SpatialRelationInfold.

(5) the UE receives a power-control command provided by using DCI format 2-2. The power-control command is directed to a group of devices using an RNTI specific for that group, and each device is configured with the power control bits in the join message it should follow.

PDSCH with UE Contention Resolution ID

In some implementations, in response to a Physical Uplink Shared Channel (PUSCH) transmission scheduled by a Random Access Response (RAR) UL grant when a UE has not been provided with a Cell-RNTI (C-RNTI), the UE attempts to detect a DCI format 1_0 with a Cyclic Redundancy Check (CRC) scrambled by a corresponding Temporary C-RNTI (TC-RNTI) scheduling a PDSCH that includes a UE contention resolution ID.

In response to receiving the PDSCH with the UE contention resolution ID, the UE may transmit a HARQ feedback in a PUCCH. The PUCCH transmission is within the same active UL BWP as the PUSCH transmission. The minimum time between the last symbol of the PDSCH received and the first symbol of the corresponding PUCCH transmission with the HARQ feedback is equal to X msec. X may be a time duration for a signal processing requirement.

In some implementations, regardless of whether a UE is configured with no HARQ feedback, the UE may still provide the HARQ feedback if one of the following conditions (1) to (4) is satisfied:

(1) the PDSCH carrying the UE contention resolution ID is associated with a HARQ process ID that is included in an exception list configured by an RRC IE.

For the HARQ process ID(s) included in the exception list, HARQ feedback transmission is performed.

(2) the PDSCH carrying the UE contention resolution ID is associated with a scheduling DCI that contains a DCI field indicator of a HARQ feedback request as '1' (or another specific value), referring to a HARQ feedback demand.

(3) the UE receives a PDSCH carrying a UE contention resolution ID.

(4) the UE receives a PDSCH associated with a TC-RNTI.

Receiving a PDSCH without Receiving a Corresponding PDCCH

In some implementations, if a UE receives a PDSCH without receiving a corresponding PDCCH, the UE may generate one corresponding HARQ-ACK information bit.

A HARQ-ACK information bit may be set to a first value and used as an ACK if the UE correctly decodes a Transport Block (TB), or set to a second value and used as a Negative ACK (NACK) if the UE does not correctly decode the TB. A HARQ feedback (or "HARQ-ACK information") may include the HARQ-ACK information bit (e.g., an ACK or NACK) for the corresponding TB.

In some implementations, regardless of whether a UE is configured with no HARQ feedback, the UE may still provide the HARQ feedback if one of the following conditions (1) to (4) is satisfied:

(1) the UE receives a PDSCH without receiving a corresponding PDCCH. For Semi-Persistent Scheduling (SPS) transmission, there might be a need to provide a HARQ-ACK information bit when an activation command is received from a UE via a PDCCH.

(2) if the UE receives a PDCCH indicating an SPS PDSCH activation, a UE may generate and provide at least one HARQ-ACK information bit corresponding to the first or any additional TB received from the activated SPS PDSCH.

(3) if the UE receives a PDCCH indicating an SPS PDSCH activation, a UE may generate and provide a HARQ-ACK information bit if validation of the SPS PDSCH activation is achieved.

(4) the UE is expected to provide HARQ-ACK information in response to an SPS PDSCH activation after N' symbols from the last symbol of a PDCCH providing the SPS PDSCH activation, where N' may be predefined or configured by higher layers or the network.

Receiving a PDCCH Indicating an SPS PDSCH Release

In some implementations, if a UE receives a PDCCH indicating an SPS PDSCH release, the UE may generate and transmit a HARQ feedback including a HARQ-ACK information bit corresponding to the PDCCH.

A HARQ-ACK information bit may present an ACK if the UE detects a DCI format 1_0 that provides an SPS PDSCH release.

A UE may be expected to provide a HARQ feedback in response to an SPS PDSCH release after N symbols from the last symbol of a PDCCH providing the SPS PDSCH release, where N may be used for signal processing requirement.

In some implementations, regardless of whether a UE is configured with no HARQ feedback, the UE may still transmit a HARQ feedback to the BS if the following condition is satisfied:

the UE receives a PDCCH indicating an SPS PDSCH release.

Spatial Setting for a PUCCH Transmission

In some implementations, if a UE is provided multiple values for a PUCCH-SpatialRelationInfo IE, the UE may determine a spatial setting for the PUCCH transmission. The UE may apply corresponding actions and a corresponding setting for a spatial domain filter to transmit the PUCCH in the first slot that is after slot $k+3 \cdot N_{slot}^{subframe, \mu}$, where k is the slot where the UE transmits a PUCCH with HARQ-ACK information with an ACK value corresponding to a received PDSCH providing the PUCCH-SpatialRelationInfo and μ is the SCS configuration for the PUCCH transmission.

In some implementations, regardless of whether a UE is configured with no HARQ feedback, the UE may still provide a HARQ feedback if one of the following conditions (1) to (4) is satisfied:

(1) the PDSCH carrying the activation command is associated with a HARQ process ID that is included in an exception list configured by an RRC IE.

For HARQ process ID(s) included in the exception list, the HARQ feedback is performed.

(2) the PDSCH carrying the activation command via a MAC CE that that contains a MAC field indicator of a HARQ feedback request as '1' (or another specific value) referring to a HARQ feedback demand.

(3) the PDSCH carrying the activation command is associated with a scheduling DCI that contains a DCI field indicator of a HARQ feedback request as '1' (or another specific value) referring to a HARQ feedback demand.

(4) the UE receives, in a PDSCH, an activation command indicating a value of pucch-SpatialRelationInfoId.

Time Alignment Command in a RAR Message

In some implementations, the RRC layer may configure the following parameter for the maintenance of UL time alignment:

timeAlignmentTimer (per Timing Advance Group (TAG)): a timer that controls how long the MAC entity considers the serving cells belonging to the associated TAG to be UL time-aligned.

In addition, in some implementations, the MAC entity may:

when a Timing Advance Command is received in an RAR message for a serving cell belonging to a TAG:

if the Random Access Preamble was not selected by the MAC entity among the contention-based Random Access Preambles:

apply the Timing Advance Command for this TAG;

start the timeAlignmentTimer associated with this TAG; or stop the timeAlignmentTimer associated with this TAG when the Contention Resolution is considered not successful, or when the Contention Resolution is considered successful for SI (system information) request, after transmitting a HARQ feedback for a MAC Protocol Data Unit (PDU) including a UE Contention Resolution ID MAC CE.

In some implementations, regardless of whether a UE is configured with no HARQ feedback, the UE may still provide a HARQ feedback if one of the following conditions (1) and (2) is satisfied:

(1) the HARQ feedback is for a MAC PDU including the UE contention Resolution ID MAC CE.

(2) the UE receives a PDSCH carrying a UE contention Resolution ID.

Semi-Persistent (SP) Zero Power (ZP) Channel Status Information-Reference Signal (CSI-RS)

In some implementations, for a UE configured with a list of ZP-CSI-RS-ResourceSet(s) provided by a higher layer parameter sp-ZP-CSI-RS-ResourceSetsToAddModList:

when the HARQ feedback corresponding to the PDSCH carrying the activation command for a ZP CSI-RS resource(s) is transmitted in slot n, the corresponding action and the UE assumption on the PDSCH Resource Element (RE) mapping corresponding to the activated ZP CSI-RS resource(s) shall be applied to start from the first slot that is after slot $n+3N_{slot}^{subframe,\ \mu}$;

when the HARQ feedback corresponding to the PDSCH carrying the deactivation command for an activated ZP CSI-RS resource(s) is transmitted in slot n, the corresponding action and the UE assumption on cessation of the PDSCH RE mapping corresponding to the deactivated ZP CSI-RS resource(s) shall be applied from the first slot that is after slot $n+3N_{slot}^{subframe,\ \mu}$.

In some implementations, regardless of whether a UE is configured with no HARQ feedback, the UE may still provide a HARQ feedback if one of the following conditions (1) to (4) is satisfied:

(1) the PDSCH carrying the activation/deactivation command is associated with a HARQ process ID that is included in an exception list configured by an RRC IE.

(2) the PDSCH carrying the activation or deactivation command via a MAC CE that contains a MAC-CE field indicator of a HARQ feedback request as '1' (or another specific value) referring to a HARQ feedback demand.

(3) the PDSCH carrying the activation or deactivation command is associated with a scheduling DCI that contains a DCI field indicator of a HARQ feedback request as '1' (or another specific value) referring to a HARQ feedback demand.

(4) a UE receives, in a PDSCH, an activation or deactivation command for ZP CSI-RS resource(s).

Antenna Ports Quasi Co-Location

In some implementations, a UE may receive an activation command that is used to map up to 8 Transmission Configuration Indication (TCI) states to the codepoints of the DCI field 'Transmission Configuration Indication.'

When the HARQ feedback corresponding to the PDSCH carrying the activation command is transmitted in slot n, the indicated mapping between the TCI states and the codepoints of the DCI field 'Transmission Configuration Indication' should be applied to start from the first slot that is after slot $n+3N_{slot}^{subframe,\ \mu}$.

In some implementations, regardless of whether a UE is configured with no HARQ feedback, the UE may still provide a HARQ feedback if one of the following conditions (1) to (4) is satisfied:

(1) the PDSCH carrying the activation command is associated with a HARQ process ID that is included in an exception list configured by an RRC IE.

(2) the PDSCH carrying the activation via a MAC CE that that contains a MAC-CE field indicator of a HARQ feedback request as '1' (or another specific value) referring to a HARQ feedback demand.

(3) the PDSCH carrying the activation command is associated with a scheduling DCI that contains a DCI field indicator of a HARQ feedback request as '1' (or another specific value) referring to a HARQ feedback demand.

(4) the UE receives, in a PDSCH, an activation command for TCI states.

Aperiodic CSI-RS

In some implementations, when the number of configured CSI triggering states in CSI-AperiodicTriggerStateList is greater than $2^{N_{TS}}-1$, where $N_{TS}$ is the number of bits in the DCI CSI request field configured by higher layers, the UE receives a sub selection indication, used to map up to $2^{N_{TS}}-1$ trigger states to the codepoints of the CSI request field in DCI.

When the HARQ/ACK corresponding to the PDSCH carrying the subselection indication is transmitted in the slot n, the corresponding action and UE assumption on the mapping of the selected CSI trigger state(s) to the codepoint(s) of the DCI CSI request field shall be applied starting from the first slot that is after slot $n+3N_{slot}^{subframe,\ \mu}$.

In some implementations, regardless UE is configured with no HARQ feedback, UE may feedback HARQ-ACK if one of the following conditions is satisfied:

(1) the PDSCH carrying the subselection indication is associated with a HARQ process ID that is included in an exception list configured by an RRC IE.

(2) the PDSCH carrying the subselection indication that that contains a MAC-CE field indicator of HARQ feedback request as '1' (or another specific value) referring to a HARQ feedback demand.

(3) the PDSCH carrying the subselection indication is associated with a scheduling DCI that contains a DCI field indicator of HARQ feedback request as '1' (or another specific value) referring to a HARQ feedback demand.

(4) a UE receives in a PDSCH a subselection indication for Aperiodic CSI-RS.

SP CSI-RS Reporting

For SP reporting on PUCCH, the PUCCH resource used for transmitting the CSI report is configured by reportConfigType. SP reporting on PUCCH is activated by an activation command, which selects one of the SP Reporting Settings for use by the UE on the PUCCH. When the HARQ-ACK corresponding to the PDSCH carrying the activation command is transmitted in slot n, the indicated SP Reporting Setting should be applied to start from the first slot that is after slot $n+3N_{slot}^{subframe, \mu}$.

In some implementations, regardless of whether UE is configured with no HARQ feedback, UE may still provide the HARQ-ACK if one of the following conditions is satisfied:

(1) the PDSCH carrying the activation or deactivation command is associated with a HARQ process ID that is included in an exception list configured by an RRC IE.

(2) the PDSCH carrying the activation or deactivation command via a MAC CE that contains a MAC-CE field indicator of a HARQ feedback request as '1' (or another specific value) referring to a HARQ feedback demand.

(3) the PDSCH carrying the activation or deactivation command is associated with a scheduling DCI that contains a DCI field indicator of a HARQ feedback request as '1' (or another specific value) referring to a HARQ feedback demand.

(4) a UE receives, in a PDSCH, an activation or deactivation command for an SP Reporting Setting.

SP CSI-RS Resource Setting

For a UE configured with a CSI resource setting(s) where the higher layer parameter resourceType set to 'semiPersistent':

when a UE receives an activation command, for a CSI-RS resource set(s) for channel measurement and a CSI-IM/NZP CSI-RS resource set(s) for interference measurement associated with a configured CSI resource setting(s), and when the HARQ-ACK corresponding to the PDSCH carrying the selection command is transmitted in slot n, the corresponding actions and the UE assumptions (including QCL assumptions provided by a list of reference to TCI-State's, one per activated resource) on a CSI-RS/CSI-IM transmission corresponding to the configured CSI-RS/CSI-IM resource configuration(s) shall be applied starting from the first slot that is after slot $n+3N_{slot}^{subframe, \mu}$.

when a UE receives a deactivation command for an activated CSI-RS/CSI-IM resource set(s) associated with a configured CSI resource setting(s), and when the HARQ-ACK corresponding to the PDSCH carrying the deactivation command is transmitted in slot n, the corresponding and UE assumption on cessation of a CSI-RS/CSI-IM transmission corresponding to the deactivated CSI-RS/CSI-IM resource set(s) shall apply to start from the first slot that is after slot $n+3N_{slot}^{subframe, \mu}$.

In some implementations, regardless of whether a UE is configured with no HARQ feedback, the UE may still transmit a HARQ feedback if one of the following conditions (1) to (4) is satisfied:

(1) the PDSCH carrying the activation or deactivation command is associated with a HARQ process ID that is included in an exception list configured by an RRC IE.

(2) the PDSCH carrying the activation or deactivation command via a MAC CE that that contains a MAC-CE field indicator of a HARQ feedback request as '1' (or another specific value) referring to a HARQ feedback demand.

(3) the PDSCH carrying the activation or deactivation command is associated with a scheduling DCI that contains a DCI field indicator of a HARQ feedback request as '1' (or another specific value) referring to a HARQ feedback demand.

(4) a UE receives in a PDSCH an activation or deactivation command for a CSI-RS resource set(s) and CSI-IM/NZP CSI-RS resource set(s).

UE Sounding Procedure

For a UE configured with one or more Sounding Reference Signal (SRS) resource configuration(s), and when the higher layer parameter resourceType in an SRS-Resource is set to 'semi-persistent':

when a UE receives an activation command for an SRS resource, and when the HARQ-ACK corresponding to the PDSCH carrying the activation command is transmitted in slot n, the corresponding actions and the UE assumptions on SRS transmission corresponding to the configured SRS resource set shall be applied to start from the first slot that is after slot $n+3N_{slot}^{subframe, \mu}$. The activation command also contains spatial relation assumptions provided by a list of references to reference signal IDs, one per element of the activated SRS resource set.

when a UE receives a deactivation command for an activated SRS resource set, and when the HARQ-ACK corresponding to the PDSCH carrying the deactivation command is transmitted in slot n, the corresponding actions and UE assumption on cessation of SRS transmission corresponding to the deactivated SRS resource set shall apply to start from the first slot that is after slot $n+3N_{slot}^{subframe, \mu}$.

In some implementations, regardless of whether a UE is configured with no HARQ feedback, the UE may still transmit a HARQ feedback if one of the following conditions is satisfied:

(1) the PDSCH carrying the activation or deactivation command is associated with a HARQ process ID that is included in an exception list configured by an RRC IE.

(2) the PDSCH carrying the activation or deactivation command via a MAC CE that that contains a MAC-CE field indicator of a HARQ feedback request as '1' (or another specific value) referring to a HARQ feedback demand.

(3) the PDSCH carrying the activation or deactivation command is associated with a scheduling DCI that contains a DCI field indicator of a HARQ feedback request as '1' (or another specific value) referring to a HARQ feedback demand.

(4) a UE receives, in a PDSCH, an activation or deactivation command for an SRS resource.

Enabling HARQ-ACK Feedback per TB

In one implementation, a UE should perform a HARQ feedback transmission for a received TB that includes any of a DL MAC CE or a specific list type of MAC CE.

The MAC layer may insert MAC CEs into the TBs to be transmitted over the transport channels. For DL transmissions, MAC CEs may be located at the beginning of the MAC PDU, while for UL transmissions, the MAC CEs may be located at the end of the MAC PDU, immediately before the padding (if present).

There are multiple types of MAC CEs, used for various purposes. For example, the various types of MAC CEs may include scheduling-related MAC CEs, random-access-related MAC CEs, timing-advance MAC CEs, activation/deactivation commands of previously configured components, Discontinuous Reception (DRX)-related MAC CEs, activation/deactivation commands of Packet Data Convergence Protocol (PDCP) duplication detection, and activation/deactivation commands of CSI reporting and SRS transmission.

The scheduling-related MAC CE may include buffer status reports and power headroom reports used to assist UL scheduling, and the configured grant confirmation MAC CE used when configuring semipersistent scheduling. The random-access-related MAC CEs may include the C-RNTI and contention-resolution MAC CEs.

In one implementation, a UE may perform a HARQ feedback transmission for a received TB that includes any of DL RRC messages or a specific list type of RRC messages. In one implementation, the RRC messages may be transmitted to the device using Signaling Radio Bearers (SRBs).

An SRB may be mapped to a Common Control Channel (CCCH) during the establishment of the connection and, once a connection is established, to the Dedicated Control Channel (DCCH).

Control-plane and user-plane data may be multiplexed in the MAC layer and transmitted to the device in the same Transmission Time Interval (TTI).

RRC is responsible for handling the RAN-related control-plane procedures, including:

Broadcast of system information necessary for the device to be able to communicate with a cell;

Acquisition of system information.

Transmission of paging messages originating from the Mobility Management Entity (MME) to notify the device about incoming connection requests. Paging is used in the RRC_IDLE state (described further below) when the device is not connected to a cell. Indication of system-information updates is another use of the paging mechanism, as is public warning systems.

Connection management, including setting up bearers and mobility. This includes establishing an RRC context, specifically, configuring the parameters necessary for communication between the device and the radio access network.

Mobility functions such as cell (re)selection.

Measurement configuration and reporting.

Handling of device capabilities; when the connection is established, the device will announce its capabilities as not all devices can support all the functionality described in the specifications.

FIG. 1 illustrates a flowchart for a communication method performed by a UE, in accordance with an implementation of the present disclosure. It should be noted that although actions 102, 104, and 106 are delineated as separate actions represented as independent blocks in FIG. 1, these separately delineated actions should not be construed as necessarily order dependent. The order in which the actions are performed in FIG. 1 is not intended to be construed as a limitation, and any number of the described blocks may be combined in any order to implement the method, or an alternate method. Moreover, one or more of the actions 102, 104, and 106 may be omitted in some implementations of the present disclosure.

In action 102, the UE may receive a HARQ ACK-less list from a BS. The HARQ-ACK-less list may indicate at least one HARQ process by including a set of HARQ process IDs. In each of the indicated HARQ process(s), a HARQ-ACK information transmission (e.g., a HARQ feedback transmission) for a DL transmission (e.g., a PDSCH or a PDCCH) is disabled.

In one implementation, the HARQ-ACK-less list may be contained in an RRC configuration from the BS.

In action 104, the UE may receive a first MAC CE on a PDSCH from the BS. The PDSCH may be associated with a first HARQ process ID in the set of HARQ process IDs.

In action 106, the UE may transmit HARQ-ACK information (or "HARQ feedback") for the PDSCH regardless of the HARQ-ACK-less list. In one implementation, the HARQ-ACK information (or HARQ feedback) may include a HARQ-ACK information bit to represent a positive ACK or a NACK. For example, the HARQ-ACK information bit value of 0 may represent a NACK, while a HARQ-ACK information bit value of 1 may represent a positive ACK.

In one implementation, the first MAC CE may include a UE contention resolution ID.

In one implementation, the first MAC CE may include a time alignment command.

In one implementation, the first MAC CE includes an SP ZP CSI-RS ID.

In one implementation, the first MAC CE may include a CSI-RS resource set ID.

Figure 2:
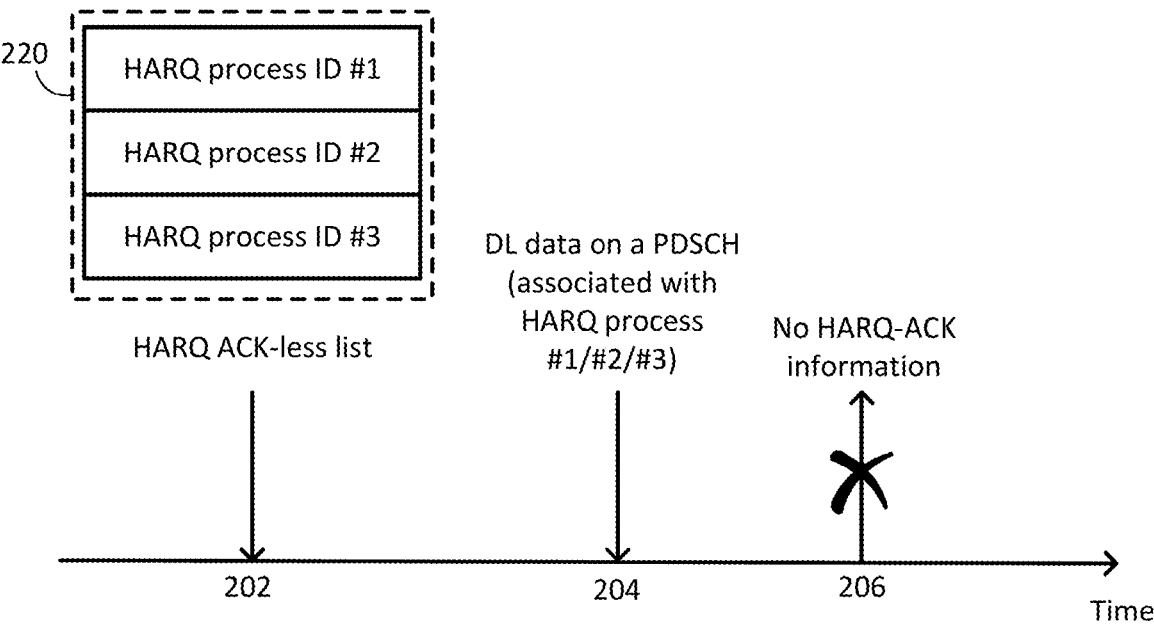
FIG. 2 is a schematic diagram illustrating a process of disabling HARQ feedback transmissions according to a HARQ ACK-less list in accordance with an implementation of the present disclosure.

FIG. 2 is a schematic diagram illustrating a process of disabling HARQ feedback transmissions according to a HARQ ACK-less list in accordance with an implementation of the present disclosure. As illustrated in FIG. 2, the UE may receive a HARQ ACK-less list 220 (e.g., via RRC signaling) at the time point 202 and receive DL data on a PDSCH at the time point 204. The HARQ ACK-less list 220 may include HARQ process ID #1, HARQ process ID #2, and HARQ ID #3, which indicate, respectively, HARQ process #1, HARQ process #2, and HARQ process #3. Thus, if the received PDSCH at the time point 204 is associated with (or corresponds to) any one of the HARQ processes (e.g., HARQ process #1, HARQ process #2, or HARQ process #3) indicated by the HARQ ACK-less list 220, the UE may disable the corresponding HARQ-ACK information transmission (or "HARQ feedback transmission") for the PDSCH. In this situation, the HARQ-ACK information to be transmitted at the time point 206 for the PDSCH transmission will not be transmitted by the UE. It is noted that the time point 206 may be determined by a $K_1$ value, which represents an offset between the DL slot (e.g., at the time point 204) where the DL data is scheduled on the PDSCH and the UL slot where the HARQ-ACK information for the PDSCH (or the scheduled DL data) need to be sent.

Figure 3:
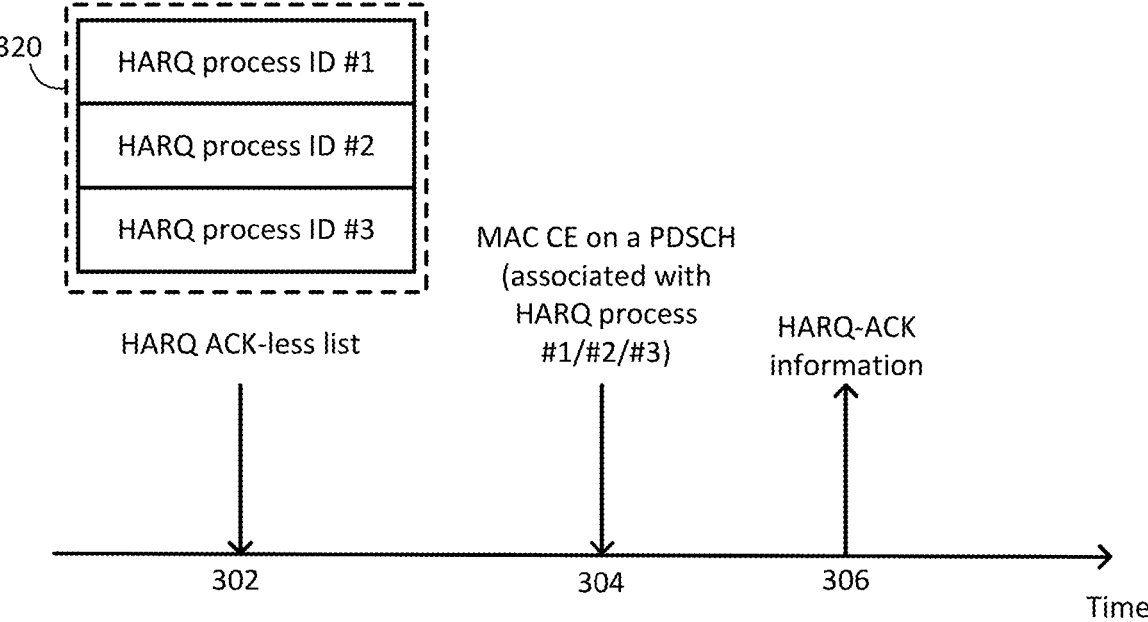
FIG. 3 is a schematic diagram illustrating that even when a HARQ feedback transmission corresponds to a HARQ process indicated by a HARQ ACK-less list, a UE still performs the HARQ feedback transmission in accordance with an implementation of the present disclosure.

FIG. 3 is a schematic diagram illustrating even when a HARQ feedback transmission corresponds to a HARQ process indicated by a HARQ ACK-less list, a UE still performs the HARQ feedback transmission in accordance with an implementation of the present disclosure. As illustrated in FIG. 3, the UE may receive a HARQ ACK-less list 320 (e.g., via RRC signaling) at the time point 302 and receive a MAC CE on a PDSCH at the time point 304. Similar to the HARQ ACK-less list 220 in FIG. 2, the HARQ ACK-less list 320 includes HARQ process ID #1, HARQ process ID #2, and HARQ ID #3, which indicate, respectively, HARQ process #1, HARQ process #2, and HARQ process #3.

In the present implementation illustrated in FIG. 3, the received PDSCH at the time point 304 is associated with (or corresponds to) one of the HARQ processes indicated by the HARQ ACK-less list 320 (e.g., HARQ process #1, HARQ process #2, or HARQ process #3). Despite this, the UE may still perform a HARQ feedback transmission at the time point 306 for the PDSCH because the PDSCH carries MAC CE signaling. The time point 306 may be determined by a $K_1$ value, which represents an offset between the DL slot (e.g., at the time point 304) where the MAC CE is scheduled on the PDSCH and the UL slot where the HARQ-ACK information for the PDSCH need to be sent.

In one implementation, the UE may receive an indication from the BS. The indication may identify an exception to the HARQ-ACK-less list by including at least one HARQ process ID from the set of HARQ process IDs. That is, the HARQ process ID(s) included in the indication contains may be considered as an exception to the HARQ-ACK-less list. In this situation, even if the UE receives a PDSCH (e.g., carries MAC CE signaling) associated with a HARQ process indicated by the HARQ-ACK-less list, the UE may still transmit the HARQ-ACK information for the PDSCH because the HARQ process associated with the PDSCH has been indicated as an exception of the HARQ-ACK-less list. In one implementation, the indication may be received via DCI from the BS. In one implementation, the indication may be received via a MAC CE from the BS. In one implementation, the indication may be received via an RRC configuration from the BS.

Figure 4:
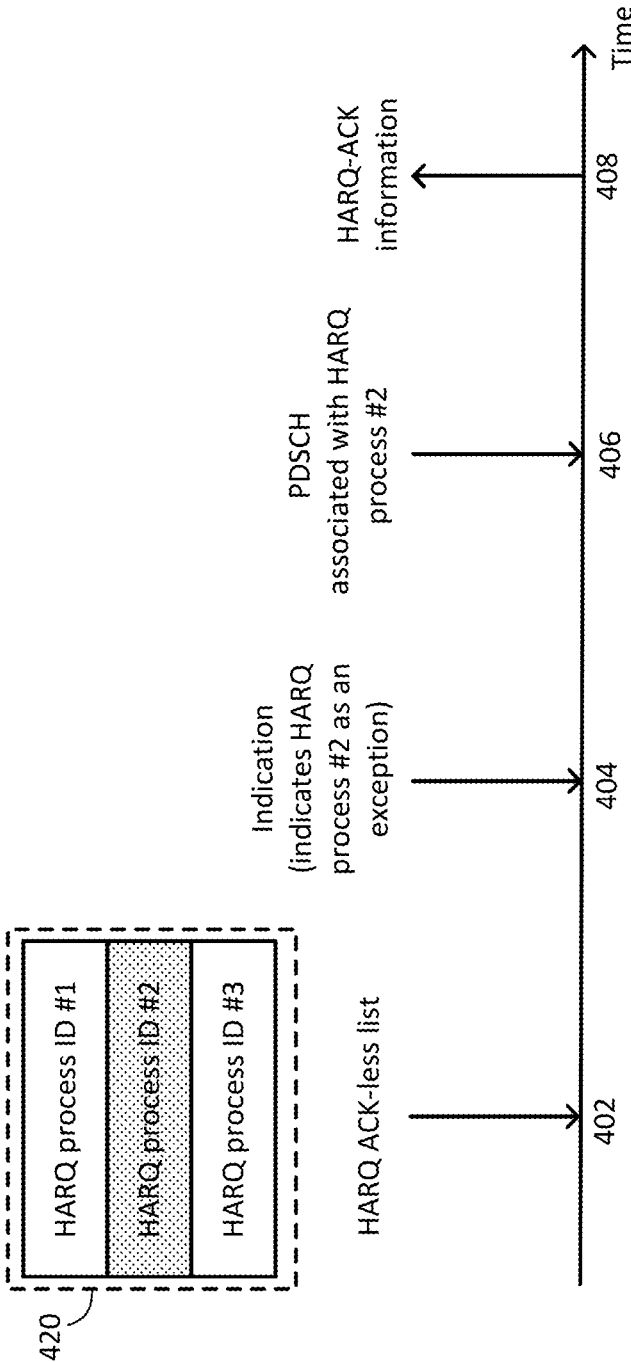
FIG. 4 is a schematic diagram illustrating a process of indicating an exception of a HARQ-ACK-less list through an indication from a BS in accordance with an implementation of the present disclosure.

FIG. 4 is a schematic diagram illustrating a process of indicating an exception of a HARQ-ACK-less list via an indication from the BS in accordance with an implementation of the present disclosure. As illustrated in FIG. 4, the UE may receive a HARQ ACK-less list 420 (e.g., via RRC signaling) at the time point 402 and receive an indication form the BS (e.g., via DCI/MAC CE/RRC signaling) at the time point 404. The HARQ ACK-less list 420 may include HARQ process ID #1, HARQ process ID #2, and HARQ ID #3, which indicate, respectively, HARQ process #1, HARQ process #2, and HARQ process #3. If the HARQ process #2 is indicated as an exception by the indication (e.g., the indication includes the HARQ process ID #2), even if the UE receives at the time point 406 a PDSCH associated with the HARQ process #2 that is indicated by the HARQ-ACK-less list 420, the UE may still transmit the HARQ-ACK information for the PDSCH because the HARQ process #2 has been indicated as an exception of the HARQ-ACK-less list 420.

It is noted that although the indication is received later than the HARQ ACK-less list 420 in the implementation illustrated in FIG. 4, the indication may be received by the UE anytime in other implementations of the present disclosure. For example, the UE may receive (or be configured with) the indication before receiving the HARQ ACK-less list, or receive the HARQ ACK-less list and the indication at the same time (e.g., received in the same signaling).

The following descriptions may be used to further elaborate the terms, examples, embodiments, actions, and/or operations mentioned above:

ToAddModList and ToReleaseList: In order to benefit from delta signaling when modifying lists with many and/or large elements, so-called add/mod- and release-lists should be used. Instead of a single list containing all elements of the list, the Abstract Syntax Notation One (ASN.1) provides two lists. One list (e.g., ToAddModList) is used to convey the actual elements that are to be added to the list or modified in the list. The second list (e.g., ToReleaseList) conveys only the IDs of the list elements that are to be released from the list. In other words, the ASN.1 defines only means to signal modifications to a list maintained in the receiver (typically the UE).

Cell: Radio network object that can be uniquely identified by a UE from a (cell) identification that is broadcast over a geographical area from one UTRAN Access Point. A Cell is either in Frequency Division Duplexing (FDD) or TDD mode.

Serving Cell: For a UE in RRC_CONNECTED not configured with CA/DC, there is only one serving cell comprising the PCell. For a UE in RRC_CONNECTED configured with CA/DC, the term 'serving cells' is used to denote the set of cells comprising the Special Cell(s) and all SCells.

HARQ: A functionality that ensures delivery between peer entities at Layer 1 (i.e., Physical Layer). A single HARQ process supports one TB when the physical layer is not configured for DL/UL spatial multiplexing, and when the physical layer is configured for DL/UL spatial multiplexing, a single HARQ process supports one or multiple TBs. There is one HARQ entity per serving cell. Each HARQ entity supports a parallel (number) of the DL and UL HARQ processes.

HARQ-ACK (information): a HARQ feedback including a HARQ-ACK information bit, where a HARQ-ACK information bit value of 0 (or another specific value) may represent a NACK, while a HARQ-ACK information bit value of 1 (or another specific value) may represent a positive ACK.

Timer: MAC entity can set up one or more timers for individual purposes, for example, for triggering some UL signaling retransmission or limiting a UL signaling retransmission period. A timer is running once it is started, until it is stopped or until it expires; otherwise, it is not running. A timer can be started if it is not running or restarted if it is running. A Timer is always started or restarted from its initial value. The initial value may be, but is not limited to, configuration by the gNB via DL RRC signaling.

BWP: A subset of the total cell bandwidth of a cell is referred to as a BWP, and Bandwidth Adaptation (BA) is achieved by configuring the UE with a BWP(s) and instructing the UE which of the configured BWPs is currently the active BWP. To enable BA on the PCell, the gNB configures the UE with a UL and DL BWP(s). To enable BA on SCells in the case of CA, the gNB configures the UE with at least a DL BWP(s) (e.g., there may be none in the UL). For the PCell, the initial BWP is the BWP used for initial access. For the SCell(s), the initial BWP is the BWP configured for the UE to first operate upon SCell activation. A UE may be configured with a first active UL BWP by a firstActiveUplinkBWP IE. If the first active UL BWP is configured for an SpCell, the firstActiveUplinkBWP IE field contains the ID of the UL BWP to be activated upon performing the RRC (re-)configuration. If the field is absent, the RRC (re-) configuration does not impose a BWP switch. If the first active UL BWP is configured for an SCell, the firstActiveUplinkBWP IE field contains the ID of the UL bandwidth part to be used upon MAC-activation of an SCell.

PDCCH: In the DL, the gNB can dynamically allocate resources to UEs via the C-RNTI/Modulation Coding Scheme (MCS)-C-RNTI/CS-RNTI on PDCCH(s). A UE always monitors the PDCCH(s) in order to find possible assignments when its DL reception is enabled (activity governed by DRX when configured). When CA is configured, the same C-RNTI applies to all serving cells.

PDSCH/PUSCH: The PDCCH can be used to schedule DL transmissions on PDSCH and UL transmissions on PUSCH.

TB: The data from the upper layer (or MAC) provided to the physical layer is basically referred to as TB(s).

Figure 5:
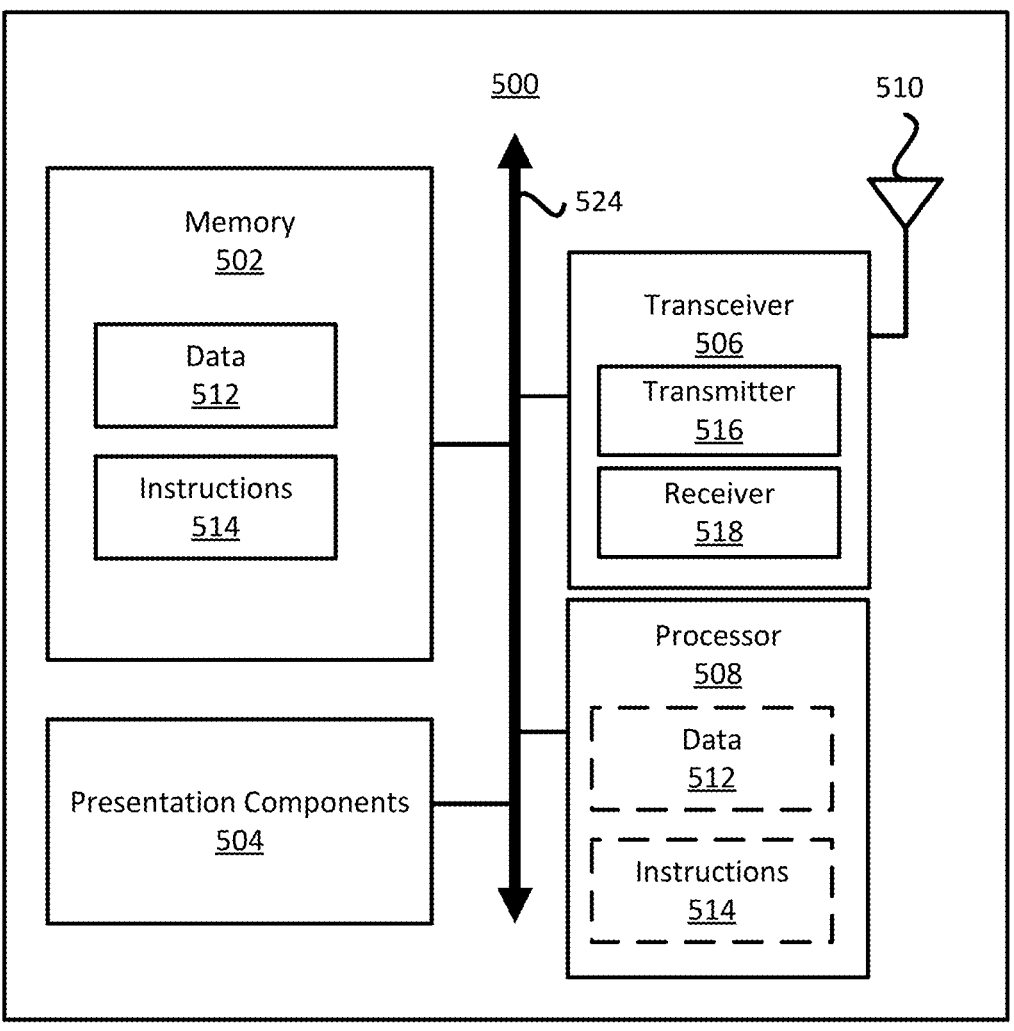
FIG. 5 illustrates a block diagram of a node for wireless communication, in accordance with an implementation of the present disclosure.

FIG. 5 illustrates a block diagram of a node 500 for wireless communication, in accordance with an implementation of the present disclosure. As illustrated in FIG. 5, the node 500 may include a transceiver 506, a processor 508, a memory 502, one or more presentation components 504, and at least one antenna 510. The node 500 may also include an RF spectrum band module, a BS communications module, a network communications module, and a system communications management module, Input/Output (I/O) ports, I/O components, and a power supply (not explicitly illustrated in FIG. 5). Each of these components may be in communication with each other, directly or indirectly, over one or more buses 524. In one implementation, the node 500 may be a UE or a BS that performs various functions described herein, for example, with reference to FIGS. 1 through 4.

The transceiver 506 having a transmitter 516 (e.g., transmitting/transmission circuitry) and a receiver 518 (e.g., receiving/reception circuitry) may be configured to transmit and/or receive time and/or frequency resource partitioning information. In one implementation, the transceiver 506 may be configured to transmit in different types of subframes and slots, including, but not limited to, usable, non-usable, and flexibly usable subframes and slot formats. The transceiver 506 may be configured to receive data and control channels.

The node 500 may include a variety of computer-readable media. Computer-readable media can be any available media that can be accessed by the node 500 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 502 may include computer storage media in the form of volatile and/or non-volatile memory. The memory 502 may be removable, non-removable, or a combination thereof. For example, the memory 502 may include solid-state memory, hard drives, optical-disc drives, etc. As illustrated in FIG. 5, the memory 502 may store computer-readable and/or computer-executable instructions 514 (e.g., software codes) that are configured to, when executed, cause the processor 508 to perform various functions described herein, for example, with reference to FIGS. 1 through 4. Alternatively, the instructions 514 may not be directly executable by the processor 508 but may be configured to cause the node 500 (e.g., when compiled and executed) to perform various functions described herein.

The processor 508 (e.g., having processing circuitry) may include an intelligent hardware device, a Central Processing Unit (CPU), a microcontroller, an ASIC, etc. The processor 508 may include memory. The processor 508 may process the data 512 and the instructions 514 received from the memory 502, and information through the transceiver 506, the baseband communications module, and/or the network communications module. The processor 508 may also process information to be sent to the transceiver 506 for transmission through the antenna 510, to the network communications module for transmission to a CN.

One or more presentation components 504 may present data indications to a person or other devices. Examples of presentation components 504 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A communication method performed by a User Equipment (UE), the communication method comprising:
   receiving a Hybrid Automatic Repeat reQuest (HARQ)-Acknowledgement (ACK)-less list from a Base Station (BS), the HARQ-ACK-less list indicating at least one HARQ process in which a HARQ-ACK information transmission for a Downlink (DL) transmission is disabled, wherein the at least one HARQ process is indicated by including a set of HARQ process Identities (IDs) in the HARQ-ACK-less list;
   receiving a first Medium Access Control (MAC) Control Element (CE) on a first Physical Downlink Shared Channel (PDSCH) from the BS, the first PDSCH being associated with a first HARQ process ID in the set of HARQ process IDs;
   receiving a second MAC CE on a second PDSCH from the BS, the second PDSCH being associated with a second HARQ process ID in the set of HARQ process IDs;
   transmitting HARQ-ACK information for the first PDSCH in response to receiving the first MAC CE; and
   forgoing transmitting any HARQ-ACK information for the second PDSCH in response to receiving the second MAC CE,
   wherein the first MAC CE includes a Channel State Information (CSI) Reference Signal (RS) resource set ID, and the second MAC CE does not include the CSI RS resource set ID.

2. The method of claim 1, further comprising:

receiving an indication from the BS, the indication identifying an exception to the HARQ-ACK-less list by including at least one HARQ process ID from the set of HARQ process IDs in the indication, the at least one HARQ process ID including the first HARQ process ID.

3. The communication method of claim 2, wherein the indication is received via Downlink Control Information (DCI).

4. The communication method of claim 2, wherein the indication is received via the second MAC CE.

5. The communication method of claim 2, wherein the indication is received via a Radio Resource Control (RRC) configuration.

6. The communication method of claim 1, wherein the HARQ-ACK-less list is included in a Radio Resource Control (RRC) configuration.

7. The communication method of claim 1, wherein the first second MAC CE includes a time alignment command.

8. A User Equipment (UE) comprising:

at least one processor; and at least one non-transitory computer-readable medium coupled to the at least one processor and storing one or more computer-executable instructions that, when executed by the at least one processor, cause the UE to:

receive a Hybrid Automatic Repeat reQuest (HARQ)-Acknowledgement (ACK)-less list from a Base Station (BS), the HARQ-ACK-less list indicating at least one HARQ process in which a HARQ-ACK information transmission for a Downlink (DL) transmission is disabled, wherein the at least one HARQ process is indicated by including a set of HARQ process Identities (IDs) in the HARQ-ACK-less list;

receive a first Medium Access Control (MAC) Control Element (CE) on a first Physical Downlink Shared Channel (PDSCH) from the BS, the first PDSCH being associated with a first HARQ process ID in the set of HARQ process IDs;

receive a second MAC CE on a second PDSCH from the BS, the second PDSCH being associated with a second HARQ process ID in the set of HARQ process IDs;

transmit HARQ-ACK information for the first PDSCH in response to receiving the first MAC CE; and forgoing transmitting any HARQ-ACK information for the second PDSCH in response to receiving the second MAC CE, wherein the first MAC CE includes a Channel State Information (CSI) Reference Signal (RS) resource set ID, and the second MAC CE does not include the CSI RS resource set ID.

9. The UE of claim 8 wherein the one or more computer-executable instructions, when executed by the at least one processor, further cause the UE to:

receive an indication from the BS, the indication identifying an exception to the HARQ-ACK-less list by including at least one HARQ process ID from the set of HARQ process IDs in the indication, the at least one HARQ process ID including the first HARQ process ID.

10. The UE of claim 9, wherein the indication is received via Downlink Control Information (DCI).

11. The UE of claim 9, wherein the indication is received via the second MAC CE.

12. The UE of claim 9, wherein the indication is received via a Radio Resource Control (RRC) configuration.

13. The UE of claim 8, wherein the HARQ-ACK-less list is included in a Radio Resource Control (RRC) configuration.

14. The UE of claim 8, wherein the second MAC CE includes a time alignment command.

* * * * *